United States Patent [19]

Matsuo et al.

[11] Patent Number: 5,301,137
[45] Date of Patent: Apr. 5, 1994

[54] CIRCUIT FOR FIXED POINT OR FLOATING POINT ARITHMETIC OPERATIONS

[75] Inventors: Takahiro Matsuo; Toshiki Fujiyama; Toru Kengaku, all of Itami, Japan

[73] Assignee: Mitsubishi Denki Kabushiki Kaisha, Tokyo, Japan

[21] Appl. No.: 47,757

[22] Filed: Apr. 14, 1993

Related U.S. Application Data

[63] Continuation of Ser. No. 732,277, Jul. 18, 1991, abandoned.

[30] Foreign Application Priority Data

Jul. 23, 1990 [JP] Japan ................................ 2-197467

[51] Int. Cl.⁵ ............................................... G06F 7/38
[52] U.S. Cl. .................................................. 364/748
[58] Field of Search ................................ 364/748, 736

[56] References Cited

U.S. PATENT DOCUMENTS 4,217,657 8/1980 Handly et al. ...................... 364/748
4,511,990 4/1985 Hagiwara et al. .................. 364/748
4,589,067 5/1986 Porter et al. ................... 364/748 X

OTHER PUBLICATIONS

IEEE 1986, Custom Integrated Circuits Conference, pp. 82–85.
User's Manual for MSM699210, OKI Electric Industry Co., Ltd. (no publication date).

*Primary Examiner*—Tan V. Mai
*Attorney, Agent, or Firm*—Townsend and Townsend Khourie and Crew

[57] ABSTRACT

An operation circuit for performing either fixed or floating point mathematical operations, having a mode control function for a multiplier including a multiplier, an arithmetic logic unit (ALU) and a signal generating circuit. A signal specifying the operating mode of the ALU, either a fixed point mode or a floating point mode is used by the signal generating circuit for generating either a fixed point multiplication signal or a floating point multiplication signal to control the multiplier, respectively.

3 Claims, 7 Drawing Sheets

Prior Art

Fig. 3
Prior Art

| FLAG | FUNCTION |
|---|---|
| ------ | ------ |
| M M | 1 ------ FIXED POINT MULTIPLICATION MODE<br>0 ------ FLOATING POINT MULTIPLICATION MODE |
| ------ | ------ |

CIRCUIT FOR FIXED POINT OR FLOATING POINT ARITHMETIC OPERATIONS

This is a continuation of application Ser. No. 07/732,277, filed Jul. 18, 1991, now abandoned.

BACKGROUND OF THE INVENTION

1. Field of the Invention

The present invention relates to an operation circuit used for a digital signal processor (DSP), more specifically to an operation circuit having a mode control function for a built-in multiplier.

2. Description of the Related Art

Figure 1:
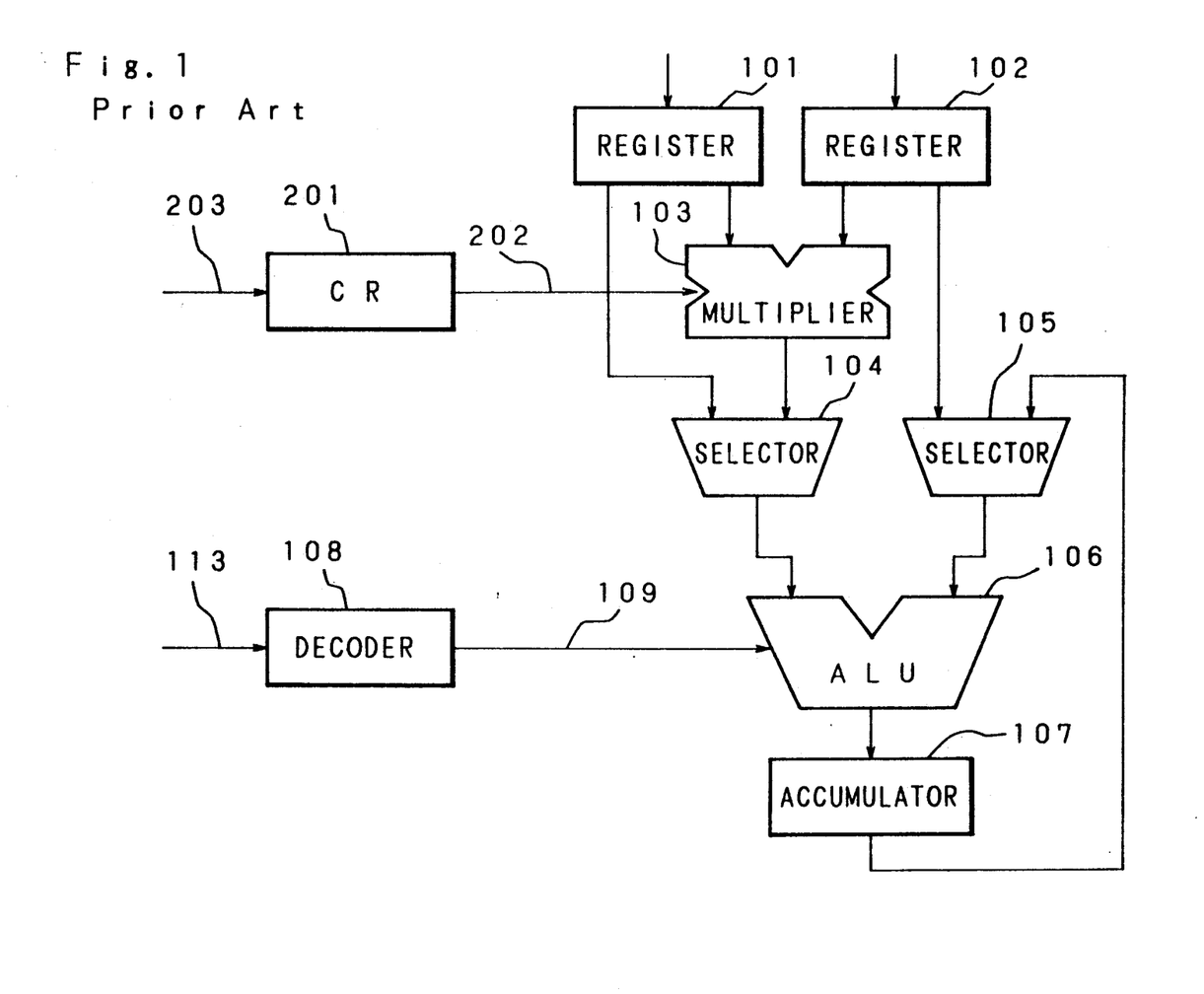
FIG. 1 is a block diagram showing a configuration example of a conventional operation circuit having mode control function for multiplier.

FIG. 1 is a block diagram showing a configuration example of an operation means having a mode control function for a multiplier of a conventional digital signal processor, which is shown on Page 9 of the users' manual of the digital signal processor MSM 699210 manufactured by Oki Electric Industries Co., LTD. (February, 1988).

In FIG. 1, both numerals 101 and 102 designate registers for storing data which is to be operated upon and an output of the register 101 is given to a multiplier 103 and a selector 104, and an output of the register 102 is given to the multiplier 103 and a selector 105.

The multiplier 103 executes mutual multiplication of data to be operated upon which are stored in the above-described registers 101 and 102, and multiplier outputs the result thereof to the selector 104. Whether the multiplier 103 executes fixed point multiplication or executes floating point multiplication at this time is specified by a mode control signal 202 being an output signal of a control register (CR) 201 given to the multiplier 103.

The control register 201 comprises a control bit controlling the operating mode of the multiplier 103. The value of a signal 203 specifies that a multiplication to be executed by the multiplier 103 is a fixed point multiplication or a floating point multiplication. In other words, signal 203 specifies the operating mode of the multiplier 103 in response to the contents of an instruction to be executed by the DSP comprising this operation circuit is determined by the control bit of the control register 201. Then, in correspondence to the value set in the control bit of the control register 201, the operating mode of the multiplier 103 is specified by the mode control signal 202.

The selector 104 selects either the output of the register 101 or the output of the multiplier 103, and gives it to an arithmetic logic unit (ALU) 106. The selector 105 selects either the output of the register 102 or the output of an accumulator 107 as described later, and gives it to the ALU 106.

The ALU 106 executes various arithmetic and logic operating with the outputs of the above-described selectors 104 and 105 taken as inputs, and outputs the results thereof to the accumulator 107.

The kind of operation, for example, fixed point operation, floating point operation or another operation, to be performed by the ALU 106 at this time is determined by the contents of the instruction to be executed by the DSP comprising this operation circuit, which will now be described.

An output of a decoder 108 is given to the ALU 106; an operation control signal 109. The decoder 108 decodes an operation specifying signal 113 according to a predetermined field for specifying an operation to be executed by the ALU 106 in the instruction to be executed by the DSP comprising this operation circuit, specifically an ALU operation specifying field, and gives the result thereof to the ALU 106 as the operation control signal 109.

Accordingly, the ALU 106 executes an operation specified by the operation control signal 109 with the outputs of the both selectors 104 and 105 as inputs, and accumulates the result thereof in the accumulator 107.

Figure 2:
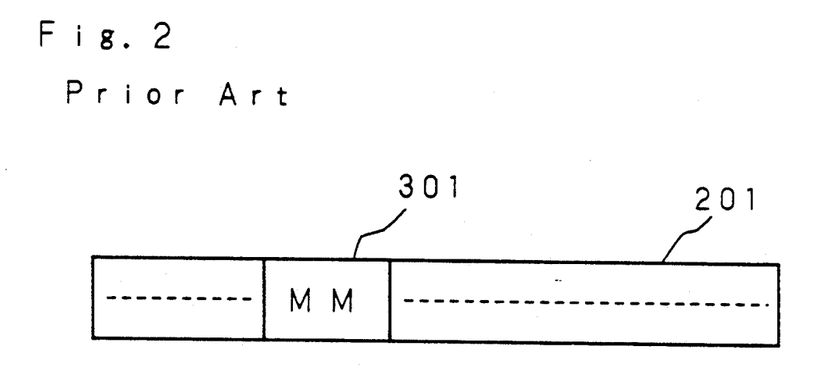
FIG. 2 is a schematic diagram showing part of an instruction field for the conventional operation circuit.

FIG. 2 is a schematic diagram showing the above-described field related to control of the multiplier 103 of the control register 201, and numeral 301 designates an MM flag stored in the above-described control bit.

Figure 3:
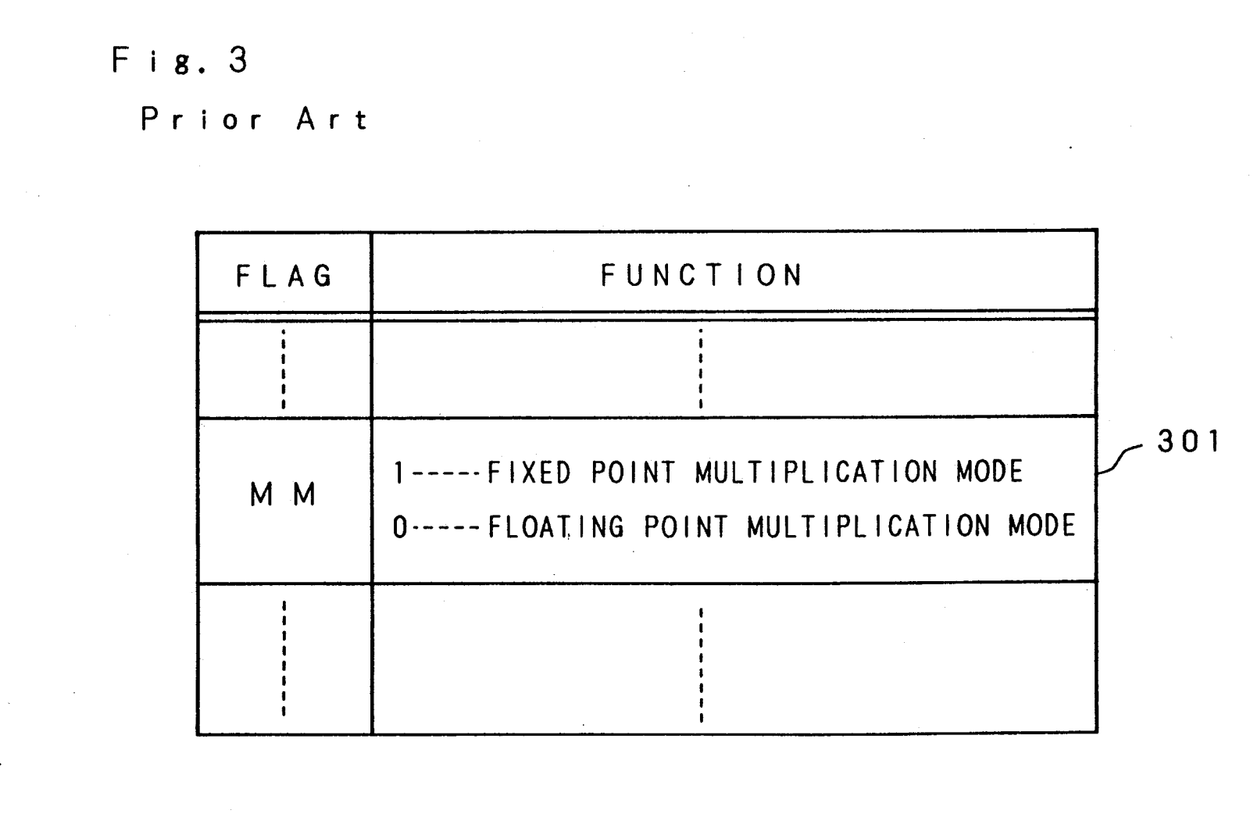
FIG. 3 is a schematic diagram showing a function of a MM flag related to control of a multiplier of a control register.

FIG. 3 is a schematic diagram showing a function of the MM flag related to control of the multiplier 103 of the control register 201 as shown in FIG. 2. In the case where the value of the MM flag 301 is set to "1", the multiplier 103 is put in the fixed point multiplication mode, and executes fixed point multiplication. Also, in the case where the value of the MM flag 301 is set to "0", the multiplier 103 is put in the floating point multiplication mode, and executes floating point multiplication.

Hereinafter, description is made on operation of the conventional operation circuit having mode control function for multiplier configured as described above.

Specifying of the operation mode of the multiplier 103, that is, setting of the value of the MM flag 301 is performed by an instruction which sets the content of the control register 201.

First, in the case where fixed point multiplication is performed, the MM flag 301 of the control register 201 is set to "1" by an instruction. Thereby, the mode control signal 202 specifying fixed point multiplication is given to the multiplier 103 from the control register 201, and therefore the multiplier 103 is put in the fixed point multiplication mode, and executes mutual fixed point multiplication of data stored in the registers 101 and 102.

On the other hand, in the case where floating point multiplication is performed, the MM flag 301 of the control register 201 is set to "0" by an instruction. Thereby, the mode control signal 202 specifying floating point multiplication is given to the multiplier 103 from the control register 201, and therefore the multiplier 103 is put in the floating point multiplication mode, and executes mutual floating point multiplication of data stored in the registers 101 and 102.

The operation mode of the ALU 106, that is, the kind of operation to be executed by the ALU 106 is specified directly by an ALU operation specifying field specifying ALU operation in the instruction. The operation specifying signal 113 corresponding to this field is decoded by the decoder 108, and is given to the ALU 106 as the operation control signal 109. Then, the ALU 106 executes an operation specified by the operation control signal 109 for data given from the both selectors 104 and 105, and makes the accumulator 107 accumulate the result thereof.

Then, in the case where sum and product operation, is executed, the data formats of product and sum are the same, and therefore the multiplier 103 and the ALU 106 process data of the same format. This means that when fixed point multiplication is performed in the multiplier 103, fixed point operation is performed in the ALU 106, and when floating point multiplication is performed in the multiplier 103, floating point operation is performed in the ALU 106.

Then, in the operation circuit having mode control function for multiplier of the conventional DSP having the configuration as described above, the operation mode of the multiplier 103, that is, whether fixed point multiplication is to be performed or floating point multiplication is to be performed is specified by the MM flag 301 of the control register 201, and the operation mode of the ALU 106, that is, whether fixed point operation is to be performed or floating point operation is to be performed is specified by the ALU operation specifying field in the instruction. In other words, the operation modes of both of the multiplier 103 and the ALU 106 are specified independently in the instruction to be executed by the DSP. For this reason, in programming, a programmer is required to consider it while recognizing the operation mode of the multiplier 103 all the time, and therefore the efficiency of programming work is reduced. Also, an instruction is necessary which sets a bit equivalent to the content of the control register 201 for controlling the operation mode of the multiplier 103, specifically the MM flag 301.

In addition, there is a problem that the operation mode actually specified to the multiplier 103 cannot be checked in debugging.

Furthermore, there is another problem that in performing an interrupt or executing a subroutine call, the operation for maintaining the operation mode specified to the multiplier 103 in the same mode before and after the execution becomes complicated.

SUMMARY OF THE INVENTION

The present invention has been achieved in the light of such circumstances, and a main object to provide an operation circuit having mode control function for multiplier which is so configurated that a multiplier performs multiplication in the same mode as that of an ALU even in the case where the programmer does not consider specifying the operation mode of the multiplier.

The present invention also objects to provide an operation circuit having mode control function for multiplier which can check the mode directed actually to the multiplier in debugging, and can maintain the operation mode directed to the multiplier in the same mode before and after an interrupt or a subroutine call in executing the interrupt or the subroutine call.

The operation circuit in accordance with the present invention comprises a multiplier, an ALU and a circuit which generates a signal specifying fixed point multiplication or floating point multiplication to the multiplier in the case where a signal specifying the operation mode of the ALU specifies fixed point operation or floating point operation to the ALU.

In the operation circuit in accordance with the present invention, based on the result of decoding the field specifying an operation to be executed by the ALU in an instruction, a signal is so generated that fixed point multiplication is specified as an instruction to be executed by the multiplier in the case where fixed point operation is specified, and floating point multiplication is specified as an instruction to be executed by the multiplier in the case where floating point operation is specified, and therefore specifying whether the multiplication to be executed by the multiplier is fixed point multiplication or floating point multiplication and specifying the operation to be executed by the ALU are not required to be performed independently in the instruction.

In addition, the operation circuit of the present invention also comprises a register holding a signal of the operation mode directed to the multiplier. Thereby, it is made possible to take the signal directing the operation mode to the multiplier outside or write it to the register.

The above and further objects and features of the invention will more fully be apparent from the following detailed description with accompanying drawings.

DESCRIPTION OF THE PREFERRED EMBODIMENTS

Hereinafter, detailed description is made on the present invention in reference to drawings showing embodiments thereof.

Figure 4:
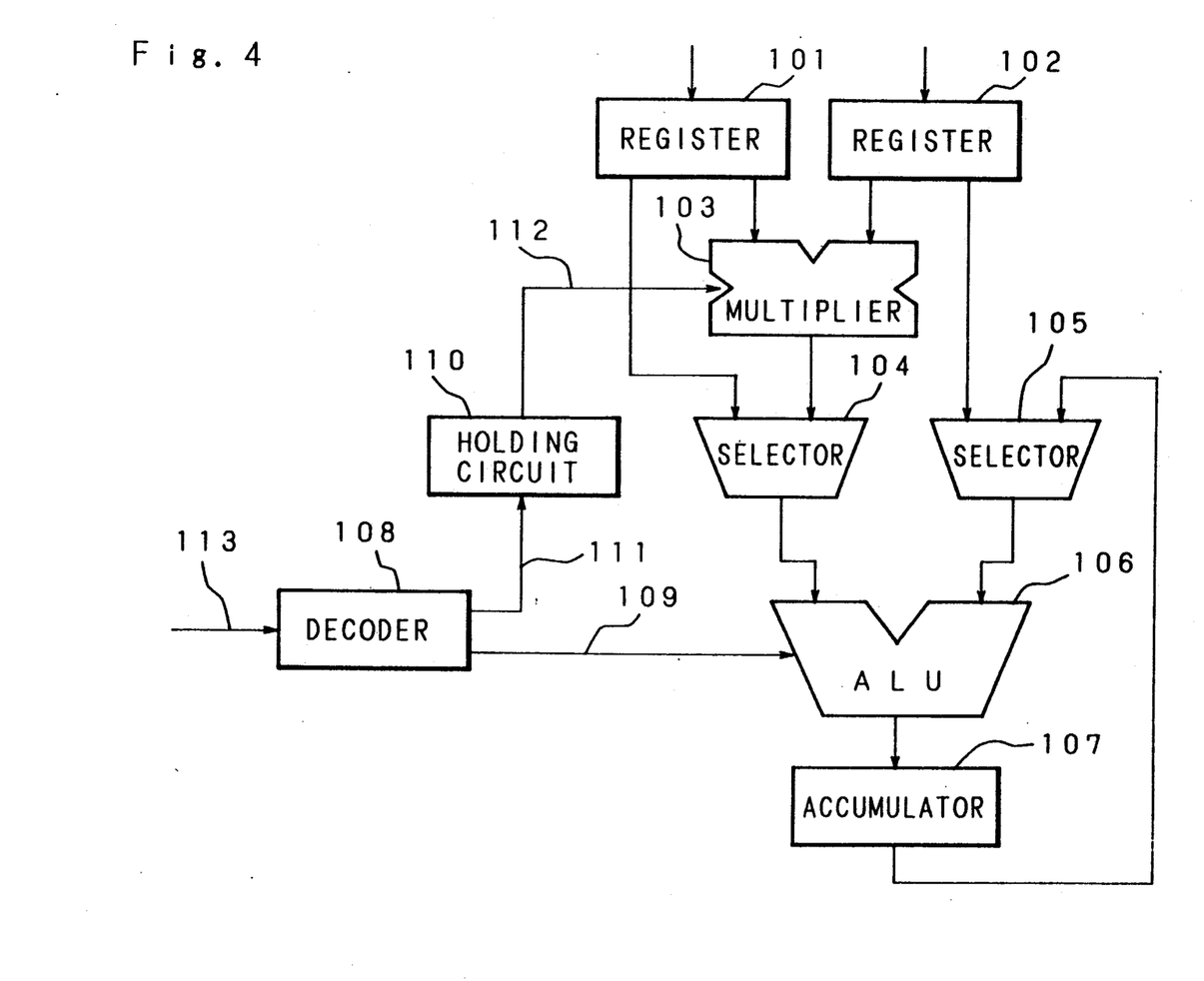
FIG. 4 is a block diagram showing a configuration example of a first embodiment of an operation circuit having mode control function for multiplier of the present invention.

FIG. 4 is a block diagram showing a configuration example of an operation circuit having mode control function for multiplier in accordance with the present invention. In addition, in FIG. 4, the same numerals and symbols as those in FIG. 1 which are referred in describing the above-described conventional example designate the same or equivalent portions.

In FIG. 4, numerals 101 and 102 designate registers storing data to be operated, and an output of the register 101 is given to a multiplier 103 and a selector 104, and an output of the register 102 is given to a selector 105.

The multiplier 103 executes mutual multiplication of data to be operated which are stored in the above-described registers 101 and 102, and outputs the result thereof to the selector 104. To the multiplier 103, an operation mode control signal 112 being an output signal of a control signal generating circuit 110 is given. The operation mode control signal 112, as described later, specifies whether a multiplication to be executed by the multiplier 103 is fixed point multiplication or floating point multiplication.

The control signal generating circuit 110 holds a signal 111 given from a decoder 108 as described later, and generates the above-described operation mode control signal 112.

The selector 104 selects either of the output of the register 101 or the output of the multiplier 103, and gives it to an ALU 106. Also, the selector 105 selects either of the output of the register 102 or the output of an accumulator 107 as described later, and gives it to the ALU 106.

The ALU 106 executes various operations with the outputs of the both selectors 104 and 105 as inputs, and outputs the results thereof to the accumulator 107.

An output of the decoder 108 is given to the ALU 106 as an operation control signal 109. The decoder 108 decodes an operation specifying signal 113 which is determined by a predetermined field for specifying an operation to be executed by the ALU 106 in an instruction, specifically an ALU operation specifying field, and gives the result thereof to the ALU 106 as the operation control signal 109.

Accordingly, the ALU 106 executes various operations specified by the operation control signal 109 with the outputs of the both selectors 104 and 105 as inputs, and accumulates the results thereof in the accumulator 107.

Also, the signal 111 representing that the operation executed by the ALU 106 is fixed point operation or floating point operation is outputted from the decoder 108 to the move-described control signal generating circuit 110. Accordingly, in correspondence to the value of the signal 111 held in this control signal generating circuit 110, the control signal generating circuit 110 generates the operation mode control signal 112 specifying the operation mode of the multiplier 103.

Hereinafter, description is made on operation of the operation circuit of the present invention having such a configuration.

First, the operation specifying signal 113 determined by the ALU operation field in the instruction is decoded by the decoder 108, and a signal specifying operation to be executed by the ALU 106 from this result, that is, the operation control signal 109 is given to the ALU 106. At the same time, the signal 111 indicating that the operation to be executed by the ALU 106 is fixed point operation, floating point operation or another operation is given to the control signal generating circuit 110, and is held therein. In addition, at this time, in the case where the operation of the ALU 106 is neither fixed point operation nor floating point operation, the content held in the control signal generating circuit 110 does not change.

Then, in the case where the control signal generating circuit 110 holds the signal showing that the operation of the ALU 106 is fixed point multiplication, the control signal generating circuit 110 outputs the operation mode control signal 112 specifying fixed point multiplication to the multiplier 103. On the other hand, in the case where the control signal generating circuit 110 holds the signal showing that the operation of the ALU 106 is floating point multiplication, the operation mode control signal 112 becomes a signal specifying floating point multiplication to the multiplier 103.

This means that the operation mode control signal 112 given to the multiplier 103 controls the multiplier 103 so as to execute fixed point multiplication in the case where fixed point operation is performed in the ALU 106, and execute floating point multiplication in the case where floating point operation is performed in the ALU 106, respectively. In addition, in the case where various operations other than fixed point operation and floating point operation are performed in the ALU 106, or in the case where no operation is performed in the ALU 106, the content of the control signal generating circuit 110 is held in the preceding status without being changed.

The ALU 106 executes the operation specified by the operation control signal 109 for the data given from the both selectors 104 and 105, and makes the accumulator 107 accumulate the result thereof.

As described, above, in the case where sum and product operation of fixed point are performed by the instruction executed by the DSP comprising the operation circuit of the present invention, the multiplier 103 executes fixed point multiplication even in the case where information for making the multiplier 103 execute fixed point multiplication is not contained in the instruction field, and in the case where sum and product operations of floating point are performed, the multiplier 103 executes floating point multiplication even in the case where information for making the multiplier 103 execute floating point multiplication is not contained in the instruction field.

Figure 5:
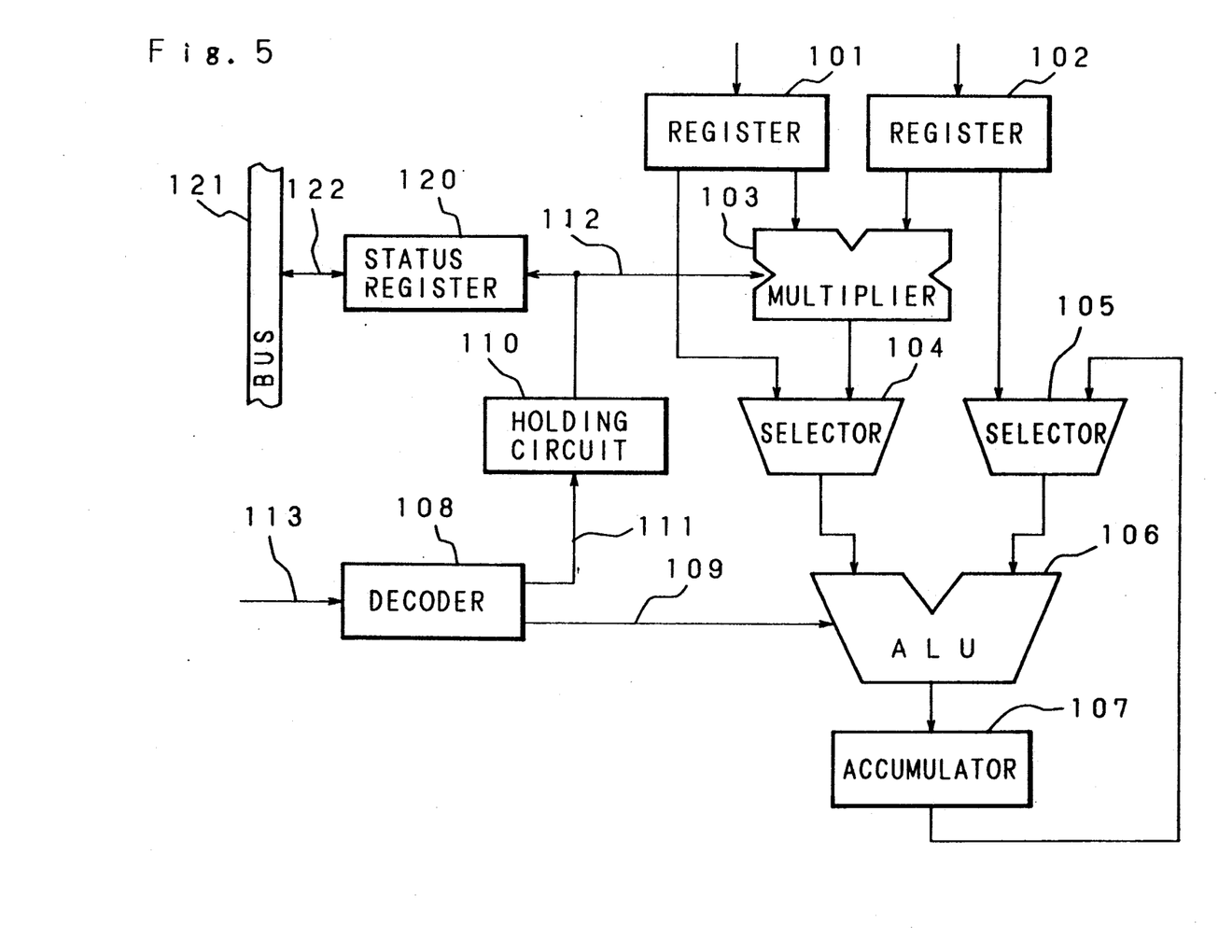
FIG. 5 is a block diagram showing a configuration example of a second embodiment of the operation circuit having mode control function for multiplier of the present invention.

Next, description is made on a second embodiment of the present invention in reference to a block diagram in FIG. 5 showing a configuration example thereof.

In this second embodiment, a status register 120 holding the operation mode control signal 112 being an output signal of the control signal generating circuit 110 is provided. Then, the status register 120 is connected to a bus 121 which is connected also to other various registers, and sends and receives data to and from the bus 121 by a signal 122.

Figure 6:
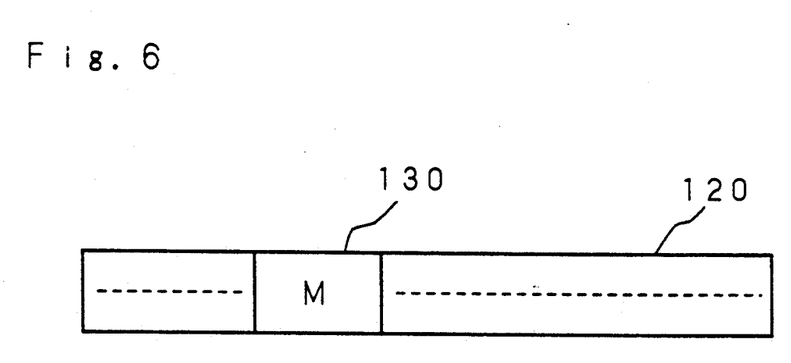
FIG. 6 is a schematic diagram showing the content of a status register thereof.

In addition, FIG. 6 is a schematic diagram showing the contents of the status register 120, and a bit 130 therein is set as a flag M. This flag M is set to "1" in the case where the operation mode control signal 112 outputted from the control signal generating circuit 110 directs fixed point multiplication to the multiplier 103, and in the case where it directs floating point multiplication thereto, the flag M is set to "0", respectively.

Accordingly, in the second embodiment of the present invention, by giving a proper instruction, it is made possible to read out the content of the status register 120 to the bus 121 as the signal 122, or in reverse to write a value "1" or "0" to the register through the bus 121.

For this reason, for example, in debugging, the control status of the multiplier 103 can be read outside to be checked. It is made also possible that, for example, in interrupt or start of a subroutine call, the value of the status register 120 is read through the bus 121 immediately therebefore and is made to save once to a proper register, and an operation is performed which writes this saved value again to the status register 120. Therefore, maintaining the operation mode of the multiplier 103 in the same mode before and after an interrupt of a subroutine call is facilitated.

Figure 7:
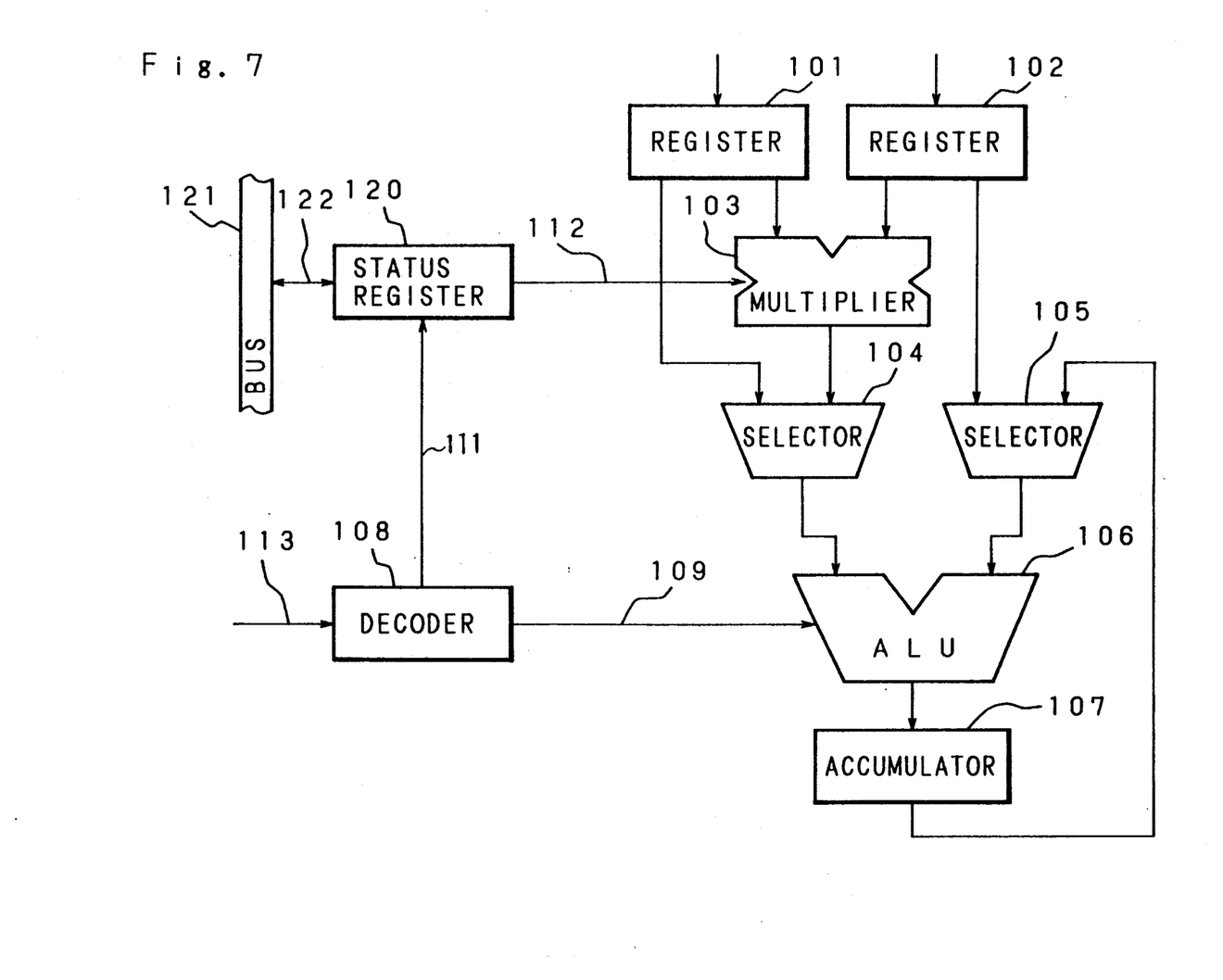
FIG. 7 is a block diagram showing a configuration example of a third embodiment of the operation circuit having mode control function for multiplier of the present invention.

FIG. 7 is a block diagram showing a configuration example of a third embodiment of the present invention.

The third embodiment is configured in a manner that the flag M (bit 130) of the status register 120 is directly written by the signal 111 (a signal showing that the operation of the ALU 106 is a fixed point operation or a floating point operation) outputted from the decoder 108, and the operation mode of the multiplier 103 is controlled by the value of this flag M.

In the case of such a configuration, the signal 111 outputted from the decoder 108 is stored once in the status register 120, and thereafter given to the multiplier 103, and therefore, a somewhat extra time is required, but hardware amount is curtailed by the amount corresponding to the control signal generating circuit 110 in comparison with the second embodiment as shown in FIG. 5.

As described above, in accordance with the present invention, control of operation of the ALU and control of the operation mode of the multiplier are performed simultaneously by the content of the field specifying operation to be performed by the ALU, and therefore the programmer can program without considering the operation mode of the multiplier, that is, whether the mode is fixed point multiplication or floating point multiplication in performing programming. Also, conventionally specifying of the multiplier mode and specifying operation of the ALU are controlled by independent fields in an instruction, but in the present invention, a field for controlling the ALU has only to be provided, and therefore the number of bits of the instruction field can be curtailed, and those bits can be used for other applications.

Furthermore, it is possible that the signal directing the operation mode to the multiplier is held in the status register, and the content of this status register is read or written from outside, and therefore checking of the operation mode of the multiplier is facilitated in debugging, and further in executing an interrupt or a subroutine call, operation is facilitated by putting the operation mode of the multiplier in the same mode before and after the execution.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds thereof are therefore intended to be embraced by the claims.

What is claimed is:

1. An operation circuit, comprising:

decoding means for generating a control signal representative of a mode field in an instruction to be executed when said mode field is present in said instruction, said control signal specifying either a fixed point mode or a floating point mode;

holding means, coupled to said decoding means, for storing and outputting an indication of said specified mode when said specified mode is indicated, and outputting an indication of a last specified mode when said mode field is not present in said instruction;

an arithmetic logic unit, coupled to said decoding means and responsive to said control signal, for performing arithmetic operations on a set of input values, wherein said arithmetic logic unit manipulates said set of input values as fixed point numbers when said control signal specifies said fixed point mode and manipulates said set of input values as floating point numbers when said control signal specifies said floating point mode;

a multiplier, coupled to said holding means, which accepts multiplier input values and outputs a multiplier output value at a multiplier output, said multiplier performing a fixed point multiplication on said multiplier input values and outputting a fixed point multiplier output value when said holding means specifies said fixed point mode, and said multiplier performing a floating point multiplication on said multiplier input values and outputting a floating point multiplier output value when said holding means specifies said floating point mode; and means for coupling said multiplier output to an input of said arithmetic logic unit.

2. The operation circuit of claim 1, wherein said means for coupling comprises means, coupled to said multiplier and said arithmetic logic unit, for selectably coupling said multiplier output to said input of said arithmetic logic unit.

3. The operation circuit of claim 1, wherein said holding means comprises a register which is readable and writable by an external circuit, and holds a representation of said control signal.

* * * * *